United States Patent [19]
Kotani et al.

[11] Patent Number: 6,146,750
[45] Date of Patent: *Nov. 14, 2000

[54] BIO-DEGRADABLE RESIN COMPOSITION, FILM AND SHAPED ARTICLE

[75] Inventors: Kozo Kotani, Toyonaka; Toshio Kawakita, Funabashi; Taiichi Sakaya; Toshiya Kuroda, both of Takatsuki, all of Japan

[73] Assignee: Sumitomo Chemical Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/522,423

[22] PCT Filed: Jan. 24, 1995

[86] PCT No.: PCT/JP95/00071

§ 371 Date: Sep. 22, 1995

§ 102(e) Date: Sep. 22, 1995

[87] PCT Pub. No.: WO95/20013

PCT Pub. Date: Jul. 27, 1995

[30] Foreign Application Priority Data

Jan. 24, 1994 [JP] Japan .................................. 6-006013

[51] Int. Cl.[7] ...................................................... B32B 5/16
[52] U.S. Cl. ............................ 428/323; 428/324; 428/480; 428/483; 428/522; 428/532; 428/35.4; 428/36.7
[58] Field of Search ............................... 106/607, DIG. 4; 525/56; 428/480, 483, 481, 36.7, 357, 35.4, 454, 522, 514, 694 BA, 324, 323, 532

[56] References Cited

U.S. PATENT DOCUMENTS

| | | | |
|---|---|---|---|
| 4,425,410 | 1/1984 | Farrell et al. | 428/516 |
| 4,818,782 | 4/1989 | Bissot | 524/413 |
| 4,983,432 | 1/1991 | Bissot | 428/35.7 |
| 5,049,609 | 9/1991 | Patitsas | 524/386 |
| 5,153,061 | 10/1992 | Cavagna | 428/325 |
| 5,206,087 | 4/1993 | Tokiwa et al. | 428/403 |
| 5,244,729 | 9/1993 | Harrison | 428/331 |
| 5,296,282 | 3/1994 | Evers | 428/195 |
| 5,300,358 | 4/1994 | Evers | 428/386 |

FOREIGN PATENT DOCUMENTS

| | | |
|---|---|---|
| 62-148532 | 7/1987 | Japan . |
| 64-43554 | 2/1989 | Japan . |
| 1-313536 | 12/1989 | Japan . |
| 3-93542 | 1/1991 | Japan . |
| 3-030944 | 2/1991 | Japan . |
| 4-323244 | 11/1992 | Japan . |
| 5-39392 | 1/1993 | Japan . |
| 6-093133 | 4/1994 | Japan . |
| WO 93/08230 | 4/1993 | WIPO . |

OTHER PUBLICATIONS

Encyclopdeia of Polymer Science and Engineering, vol. 17., pp 167–197, 1985.

Chemical Abstracts, vol. 101, No. 20, (Nov. 1994), Abstract No. 174111.

Chemical Abstracts, vol. 123, No. 6, (Aug. 1995), Abstract No. 58164.

*Primary Examiner*—Paul Thibodeau
*Assistant Examiner*—D. Lawrence Tarazano
*Attorney, Agent, or Firm*—Pillsbury Madison & Sutro LLP

[57] ABSTRACT

The disclosed composition contains a biodegradable resin, and an inorganic laminar compound having an aspect ratio of not less than 50 and not more than 5000. A biodegradable film or shaped article includes, as at least a portion thereof, a layer (1) found from this biodegradable resin composition. The biodegradable resin composition, film or shaped article can exhibit a good gas barrier property while substantially retaining the desired biodegradability. Therefore, it can considerably contribute to the maintenance or protection of a terrestrial environment such as the disposal of trash or rubbish, or plastic wastes; and the reduction in the amount of wastes in landfills.

10 Claims, 9 Drawing Sheets

"k" (IN TERMS OF LENGTH) IS NOT SMALLER THAN WIDTH OF ONE RESIN CHAIN $\theta_d \rightarrow$ ANGLE OF DIFFRACTION CORRESPONDING TO ("UNIT THICKNESS a + WIDTH OF ONE RESIN CHAIN")

Fig. 3

PEAK OF UNIT THICKNESS a

TABLE 1

| | BASE MATERIAL LAYER (THICKNESS μm) | INORGANIC SUBSTANCE—CONTAINING LAYER [VOLUME RATIO] (THICKNESS μm) | OXYGEN PERMEABILITY (30°C.60%RH) cc/m²·d·atm | BIO·DEGRADABILITY TEST | |
|---|---|---|---|---|---|
| | | | | RATIO OF REMAINING AREA | APPEARANCE |
| EX.1 | PHB (150) | F/H [3/7] (0.5) | < 0.1 | 55 | × |
| EX.2 | HBHV4 (150) | F/H [3/7] (0.5) | < 0.1 | 78 | × |
| EX.3 | HBHV9 (150) | F/H [3/7] (0.5) | < 0.1 | 75 | × |
| EX.4 | HBHV9 (150) | F/H [4/6] (0.8) | < 0.1 | 70 | × |
| EX.5 | HBHV4 (150) | F/H [2/8] (1.5) | < 0.1 | 69 | × |
| EX.6 | HBHV4 (150) | F/H [1.5/8] (2.0) | < 0.1 | 81 | × |
| EX.7 | HBHV4 (150) | F/H [1/8] (1.5) | < 0.1 | 75 | × |
| EX.8 | CHI (50) | F/H [2/8] (1.5) | < 0.1 | 51 | × |
| EX.9 | CHIT (50) | F/H [1.5/8] (2.0) | < 0.1 | 40 | × |
| EX.10 | PUR (20) | F/H [1.5/8] (2.0) | < 0.1 | 40 | × |
| EX.11 | PHB (150) | F/H [2/8] (0.5) Z | < 0.1 | 70 | × |
| EX.12 | PHB (150) | F/H [1.5/8] (0.8) Z | < 0.1 | 75 | × |
| COMP.EX.1 | PHB (150) | NONE | 50 | 76 | × |
| COMP.EX.2 | HBHV4 (150) | NONE | 80 | DECOMPOSITION | × × |
| COMP.EX.3 | HBHV9 (150) | NONE | 80 | 30 | × |
| COMP.EX.4 | PHB (150) | 117H (0.5) | 4.0 | 83 | × |
| COMP.EX.5 | LDPE (60) | NONE | ≥ 500 | 100 | ○ |

BIO-DEGRADABLE RESIN COMPOSITION, FILM AND SHAPED ARTICLE

This application claims benefit of international application PCT/JP95/00071, filed Jan. 24, 1995.

BACKGROUND OF THE INVENTION

1. Technical Field

The present invention relates to a resin composition having excellent biodegradability and excellent gas barrier properties, and a film or a shaped (or molded) article comprising such a resin composition.

2. Background Art

A film having a gas barrier property (gas barrier film) is a kind of functional film that has been widely used in the fields of food, medicine, agricultural chemicals, cosmetics, etc., wherein contents to be contained therein are stored or protected while the "quality" of the contents is liable to cause a problem. One of such important use of the film includes the field of "packaging".

Packaging includes making or putting an object into a package or wrap. The material for the packaging is desired to have a wide variety of functions. For example, packaging may serve various functions including providing mechanical protection, safety, sanitary protection, workability, adaptability to goods (transparency, printability, heat sealing property), utility, profitability, etc. Having a "gas barrier property" against various gases is important as it affects the storability of the packaged contents such as food. Along with recent diversification in the form of goods distribution, in packaging techniques, and an intensification of additive control, change in taste, etc., the gas barrier property has become increasingly more important. On the other hand, the gas barrier property has heretofore been a serious weak point of ordinary plastic materials.

Factors which can deteriorate a food include oxygen, light, heat and/or moisture. Among these factors, oxygen has been considered to be a substance causing such deterioration. A material having a gas barrier property (gas barrier material) is a material which has a main function of effectively intercepting oxygen. Such a gas barrier material exhibits the function of intercepting oxygen, and simultaneously exhibits a function which is essential for various measures for controlling the deterioration of food (such as gas charging and vacuum packaging). The gas barrier material has been utilized very effectively in many fields such as food packaging inclusive of confectionery bags, bags for dried bonito, pouches for retorted foods, containers for carbonated drinks, etc., or packaging for cosmetics, agricultural chemicals, and medical use, on the basis of its barrier function to various kinds of gases such as oxygen, organic solvent vapors, aromas; or on the basis of its function of preventing corrosion, odor, sublimation, etc., based on the barrier function thereof.

Among films comprised of a thermoplastic resin, those films comprising oriented polypropylene, polyester, polyamide, etc., particularly have excellent mechanical, heat resistance, and transparency properties, etc., and therefore these films are widely used as a packaging material. However, the barrier property against oxygen permeability is insufficient as these films have large gas permeability. Therefore, in a case where a film comprised of such a material is used for food packaging, the food in the package is liable to be deteriorated due to degradation based on oxidation, or the function of aerobic bacteria, etc. Accordingly, when a film of the above-mentioned material such as polypropylene is used for food packaging, it is usual to adopt a method wherein another film (or layer) having an excellent oxygen barrier property is laminated onto the film of the above-mentioned material.

The following two methods are representative measures for forming such a film having a good barrier property to oxygen. One method involves using a metal foil lamination such as aluminum foil lamination. The other method involves vapor-depositing a metal onto a surface of a thermoplastic resin film. In these methods, the excellent gas barrier property (particularly, a gas barrier permeability to oxygen) of the resultant metal foil has been effectively utilized.

On the other hand, as a transparent plastic raw material having a small oxygen permeability, there have heretofore been known some films comprising a raw material such as polyvinyl alcohol, polyethylene-vinyl alcohol copolymer, and polyvinylidene chloride-type resin. However, these plastic materials have an oxygen permeability to a certain degree which is never negligible, while a metal or glass raw material to be used for canned foods or bottled foods only has a substantially no oxygen permeability.

Methods involving dispersing an inorganic substance (in a flat shape) in a resin are known techniques for imparting gas barrier properties or increasing the gas barrier property of a resin. For example, Japanese Laid-Open Patent Application (KOKAI) No. 148532/1987 (i.e., Sho 62-148532) describes a process for producing a film having a gas barrier property wherein a coating liquid composition comprising a transparent thermoplastic resin and mica in the form of flakes having a particle size of 500 µm or smaller and an aspect ratio of 5 or larger, is applied onto a base material having a releasing property and then dried, and thereafter is peeled from the base material.

In addition, Japanese Laid-Open Patent Application No. 043554/1989 (i.e., Sho 64-043554) discloses a resin composition for barrier layer wherein muscovite ($KAl_3(AlSi_3O_{10})(OH)_2$; non-swelling type mica) is used as mica in the form of flakes, the particle size is made smaller than 325 mesh (44 µm), and the aspect ratio is in the range of 20–140. Further, Japanese Laid-Open Patent Application No. 093542/1991 (i.e., Hei 03-093542) discloses a process for producing a plastic film having a barrier property wherein a coating composition comprising a silyl group-containing modified polyvinyl alcohol and synthetic hectorite (trade name: Laponite XLS, mfd. by Nihon Silica Kogyo Co.) in a wt. ratio of 50:50, is applied onto a biaxially oriented polyethylene terephthalate (OPET), and then subjected to drying and heat treatment (130° C. to 150° C.).

In general, the above-mentioned packaging material is used for a "disposable or throwaway" application. Therefore, it is important to impart a biodegradability to the packaging material, as some problems in the terrestrial environment have attracted more and more attention in recent years.

However, at present, a material which has a high gas barrier property to an extent such that it is suitable for the preservation and/or protection of a content to be contained in the material, and also has a biodegradability to an extent such that it can contribute to the maintenance or protection of the terrestrial environment has not yet been on the market.

SUMMARY AND OBJECTS OF THE INVENTION

An object of the present invention is to provide a resin composition, a film, or a shaped article which solves the above-mentioned problems.

A more specific object of the present invention is to provide a resin composition, a film, or a shaped article having both biodegradability as well as an oxygen barrier properties at a good level.

As a result of earnest study, the present inventors have found that a resin composition having an excellent biodegradability as well as an excellent gas barrier property has been provided by constituting a resin composition while an inorganic laminar compound having a specific aspect ratio is combined with a biodegradable resin. As a result of further study, the present inventors have also found that the above-mentioned excellent biodegradability and gas barrier properties are substantially retained, even when a biodegradable resin film or shaped article is constituted by incorporating thereinto at least a layer (or portion) comprising the above-mentioned specific resin composition.

The biodegradable resin composition according to the present invention is based on the above discovery and comprises: a biodegradable resin; and an inorganic laminar compound having an aspect ratio of not less than 50 and not more than 5000.

The present invention also provides a biodegradable resin film or shaped article comprising, as at least a layer (or portion) thereof, a biodegradable resin composition which comprises: a biodegradable resin; and an inorganic laminar compound having an aspect ratio of not less than 50 and not more than 5000.

DETAILED DESCRIPTION OF THE INVENTION

The present invention is now described with reference to the accompanying drawings, as appropriate.

A resin which is biodegradable (or bio-disintegrable) can be used, without particular limitation, as the biodegradable resin composition in the present composition. The expressions "biodegradable" or "biodisintegrable resin" as used herein refers to a resin having such a property that it is capable of being degraded (or broken-down) or disintegrated under the action of a microorganism.

The biodegradable resin composition, film and shaped article according to the present invention may preferably have a biodegradability which is equal to or comparable to a representative commercially available biodegradable resin, "Biopol" (trade name; poly-3-hydroxybutyrate, mfd. by ICI, United Kingdom).

More specifically, e.g., when a biodegradable resin composition is formed into a film shape having a thickness of about 150 μm and then subjected to the following biodegradability test", a sample comprising the biodegradable resin composition according to the present invention may preferably have a residual area ratio S satisfying a relationship of ≦0 S<90. Herein, "B" denotes the residual area ratio of the above-mentioned "Biopol" (poly-3-hydroxybutyrate) as a comparative sample, and "S" denotes the residual area ratio of a sample comprising the biodegradable resin composition according to the present invention. Further, a sample comprising the biodegradable resin composition according to the present invention may preferably have a "relative" residual area ratio (%) of 130% or less (more preferably, 100% or less, particularly preferably, 80% or less), provided that the "relative" residual area ratio (%)= (S/B)×100. The "residual area ratio"=(base area of film after the degradation test)/(base area of film before the degradation test)×100.

Biodegradability Test

There is provided a "Poly-Cup" (a wide-mouthed bottle-type container made of polyethylene) having a capacity of 1000 mL, with four openings (each of 1 cm square) provided to the bottom thereof so that the resultant four openings are arranged in a square-like configuration with a distance therebetween of about 15 mm counted from each other. Into the Poly-Cup, there is charged about 500 mL of culture soil (trade name: "Kumiai-Taihei Horticultural Soil", mfd. by Taihei Bussan Co.) containing 0.35 g/l kg (per culture soil) of nitrogen, 1.5 g/l kg of phosphoric acid, and 0.35 g/l kg of potassium, and having a pH of 6.0–5.5. Onto the surface of the thus charged culture soil, three pieces of sample films (wherein two pieces of the sample films comprise a resin composition to be evaluated, and the other one piece of the sample film comprises the above-mentioned "Biopol" as a standard sample) having a film thickness of about 150 μm, and a base area of about 28.4 cm² are disposed so that the three sample films are not overlapped to each other. The thus disposed films are further covered with the above-mentioned culture soil so that the above-mentioned 1000 mL Poly-Cup is filled up with the soil.

The resultant Poly-Cup is placed on a predetermined open-air ground (average temperature: about 25° C.) and is left standing with the elapse of time, while providing water in an amount of about 200 mL per one Poly-Cup with a frequency of once per three days so as to always maintain the culture soil contained in the Poly-Cup in a wet state. In the states of the films after a period of two months counted from the beginning of the test, the appearances and residual area (ratios) of the above three films are observed.

As the above biodegradable resin, it is preferred to use a biopolymer which is capable of being synthesized in a living organism (and a chemically modified product thereof), or a synthetic biodegradable polymer. More specific examples of such a polymer may include: for example, cellulose; cellulose derivatives such as hydroxymethyl cellulose, hydroxyethyl cellulose, carboxymethyl cellulose; polysaccharides and chemically modified product thereof such as amylose, amylopectin, pullulan, curdlan xanthan, chitin and chitosan; polyesters producible by microorganisms such as poly-3-hydroxybutyrate, and 3-hydroxybutyrate-3-hydroxyvalerate copolymer; and enzymatically degradable synthetic polymers, such as biodegradable aliphatic polyesters, polyvinyl alcohol, and polyethylene glycol.

Highly-hydrogen-bonding Resin

The biodegradable resin usable in the present invention may preferably be a highly hydrogen-bonding resin, in view of the gas barrier property thereof. The "highly hydrogen-bonding resin" may preferably be a resin having a weight percent (percent by weight) of a hydrogen-bonding group (in a case where the resin contains two or more of the hydrogen-bonding groups, total of these groups) per unit weight of the resin, which is 10% or more, more preferably about 20%–60%.

The "hydrogen-bonding group" used herein refers to a group having at least one hydrogen atom directly bonded to a hetero atom (i.e., atom other than carbon). Specific examples of the hydrogen-bonding group may include: hydroxyl group (inclusive of carboxyl group), amino group, thiol group, amide group, etc.

The content of the hydrogen-bonding group or ionic group may preferably be measured, e.g., by utilizing a technique of nuclear magnetic resonance (NMR), such as $^1$H-NMR and $^{13}$C-NMR.

The highly hydrogen-bonding resin useful in the present invention is not particularly limited, as long as it has a highly hydrogen-bonding property as described above. Preferred examples of the highly hydrogen-bonding resin may include: polyvinyl alcohol, polysaccharide, derivatives of these resins, etc. In the case of an ideal polyvinyl alcohol, i.e., —$(CH_2CHOH)_n$—, the weight percent of the OH group as the above-mentioned hydrogen-bonding group is (17/44)×100=about 39%.

In the present invention, the "polyvinyl alcohol" refers to a polymer predominantly comprising a monomer unit of vinyl alcohol. Specific examples of such a "polyvinyl alcohol" may include: a polymer (exactly, a copolymer of vinyl alcohol and vinyl acetate) obtained by subjecting the acetic acid portion of a vinyl acetate polymer to hydrolysis or ester interchange (saponification), and polymers obtained by saponifying a polymer such as vinyl trifluoroacetate polymer, vinyl formate polymer, vinyl pivalate polymer, t-butyl vinyl ether polymer, and trimethylsilyl vinyl ether polymer. A person skilled in the art can refer to a book entitled "PVA no Sekai (World of PVA)" edited by POVAL-KAI (POVAL Society), (1992), published by KOBUNSI KANKO-KAI (Polymer Publishing Society) K. K.; and a book entitled "Poval" written by Nagano et al. (1981), published by KOBUNSI KANKO-KAI for details about the polyvinyl alcohol.

The degree of the "saponification" in the polyvinyl alcohol may preferably be not less than 70%, more preferably, not less than 85%, in terms of mole percentage. The degree of polymerization of the polyvinyl alcohol may preferably be not less than 100 and not more than 5000 (more preferably, not less than 200 and not more than 3000).

On the other hand, "polysaccharide and derivatives thereof" usable in the present invention may also include biopolymers which are synthesized in a living organism on the basis of condensation polymerization, and those obtained by chemically modifying these biopolymers. Specific examples of the "polysaccharide and derivatives thereof" may include: cellulose, cellulose derivatives such as hydroxymethyl cellulose, hydroxyethyl cellulose, and carboxymethyl cellulose; amylose, amylopectin, pullulan, curdlan, xanthan, chitin, chitosan, etc.

Inorganic Laminar Compound

The "layered compound" refers to a compound or substance having a layer structure. The "layer structure" is a structure wherein planes, each of which comprises atoms strongly bonded to each other on the basis of covalent bonds, etc., so as to form close packing, are stacked substantially parallel to each other on the basis of weak bonding power such as Van der Waals force.

The "inorganic laminar compound" usable in the present invention is not particularly limited, as long as the "aspect ratio" thereof measured by a method described hereinafter is not less than 50 and not more than 5000. In view of the gas barrier property, the aspect ratio may preferably be not less than 100 (particularly, not less than 200).

When the above aspect ratio is less than 50, the exhibition of the gas barrier property becomes insufficient. On the other hand, it is technically difficult to obtain an inorganic laminar compound having an aspect ratio exceeding 5000, and further such a compound is costly or expensive from an economic viewpoint. The ease in production of an inorganic laminar compound, the aspect ratio may preferably be not more than 2000 (more preferably, not more than 1500). In view of the balance between the gas barrier property and the ease of its production, the aspect ratio may preferably be in the range of 200–3000.

In view of the film forming property or formability in the form of a film or shaped article, the "particle size" measured by a method therefor described hereinafter may preferably be not more than 5 $\mu$m. When the particle size exceeds 5 $\mu$m, the film forming property or formability of a resin composition tends to be decreased. In view of the transparency of a resin composition, the particle size may more preferably be not more than 3 $\mu$m. In a case where the resin composition according to the present invention is used for a purpose (e.g., purpose of food packaging) wherein the transparency is important, the particle size may particularly preferably be not more than 1 $\mu$m.

In view of the effect thereof on an ecological environment, the inorganic laminar compound to be used in the present invention may preferably be one which is non-poisonous or substantially non-poisonous in an ecological system. Specific examples of such an inorganic laminar compound may include: e.g., phosphoric acid salt-type derivative compounds (such as zirconium phosphate-type compound), clay-type minerals, etc.

In view of the ease in obtaining a very large aspect ratio (an aspect ratio of about 200 or more), it is preferred to use an inorganic laminar compound having a property such that it is swollen or cleft in a solvent.

The degree of the "swelling or cleavage" of the inorganic laminar compound to be used in the present invention in a solvent may be evaluated by a "swelling or cleavage" test. The inorganic laminar compound may preferably have a swelling property of not less than about 5 (more preferably, not less than about 20) according to the following swelling test. On the other hand, the inorganic laminar compound may preferably have a cleavage property of not less than about 5 (more preferably, not less than about 20) according to the following cleavage test. In these cases, a solvent having a lower density than the density of the inorganic laminar compound is used. When the inorganic laminar compound is a natural clay mineral having a swelling property, it is preferred to use water as the above solvent.

Various methodologies for testing the properties of the laminar compound are described hereinbelow.

Swelling Property Test 2 g of an inorganic laminar compound is slowly added to 100 mL of a solvent, while 100 mL-graduated cylinder is used as a container. The resultant mixture is left standing, and thereafter the volume of the former (the dispersion layer of the inorganic laminar compound) is read from the graduation corresponding to the interface between the dispersion layer of the inorganic laminar compound and the supernatant after 24 hours at 23° C. When the resultant value is larger, the swelling property is higher.

Cleavage Property Test 30 g of an inorganic laminar compound is slowly added to 1500 mL of a solvent, and is dispersed by means of a dispersion machine (DESPER MH-L, mfd. by Asada Tekko K. K., vane diameter=52 mm, rotating speed=3100 rpm, container capacity=3 L, distance between the bottom face and the vane=28 mm) for 90 minutes at a peripheral speed of 8.5 m/sec (23° C.). Thereafter, 100 mL of the resultant dispersion liquid is taken out and placed into a graduated cylinder, and then is left standing for 60 minutes. Then, the volume of the dispersion layer of the inorganic laminar compound is read from the graduation corresponding to the interface between the dispersion layer of the inorganic laminar compound and the supernatant.

As the inorganic laminar compound capable of being swollen or cleft in a solvent, it is particularly preferred to use a clay mineral having a swelling or cleaving property. The clay minerals may be classified into two types, i.e., one type having a two-layer structure, which comprises a silica tetrahedral layer, and an octahedral layer disposed thereon and comprising a central metal such as aluminum and magnesium; and another type having a three-layer structure, which comprises an octahedral layer comprising a central metal such as aluminum and magnesium, and a silica tetrahedral layer disposed on both sides of the octahedral layer so as to sandwich the octahedral layer.

Specific examples of the former two-layer type may include: kaolinite series, antigorite series, etc. Specific examples of the latter three-layer type may include: smectite series, vermiculite series, mica series, etc., depending on an interlayer cation contained therein.

More specific examples of the clay mineral may include: kaolinite, dickite, nacrite, halloysite, antigorite, chrysotile, pyrophyllite, montmorillonite, hectorite, tetrasilylic mica, sodium taeniolite, muscovite, mercallite or margarosanite, talc, vermiculite, phlogopite, xanthophyllite, chlorite, etc.

Particle Size

In view of difficulty, etc., in the measurement of the (true) particle size in a resin composition, in the present invention, a value (L) which may be determined in a solvent by a dynamic light scattering method (photon correlation spectroscopy) as described hereinafter is used as the "particle size" of the inorganic laminar compound. The "dynamic light scattering method" used herein is a particle size-measuring method utilizing a scattering phenomenon of laser light, wherein scattering light from particles conducting Brownian movement, i.e., scattering light with fluctuation depending on the moving velocity or particle size (grain size) of these particles, is detected, and an information on the particle size is obtained by calculation.

According to the present inventors' knowledge, the particle size of the inorganic laminar compound contained in a resin may be approximated by the above mentioned "particle size in a solvent" obtained by the dynamic light scattering method. For example, in a case where an inorganic laminar compound which has sufficiently been swollen with a solvent (which is the same kind of the solvent used in the dynamic light scattering method) is combined with a resin, the particle size of the inorganic laminar compound contained in the resin may sufficiently be approximated by the "particle size in a solvent" obtained by the dynamic light scattering method.

Aspect Ratio

Figure 1:
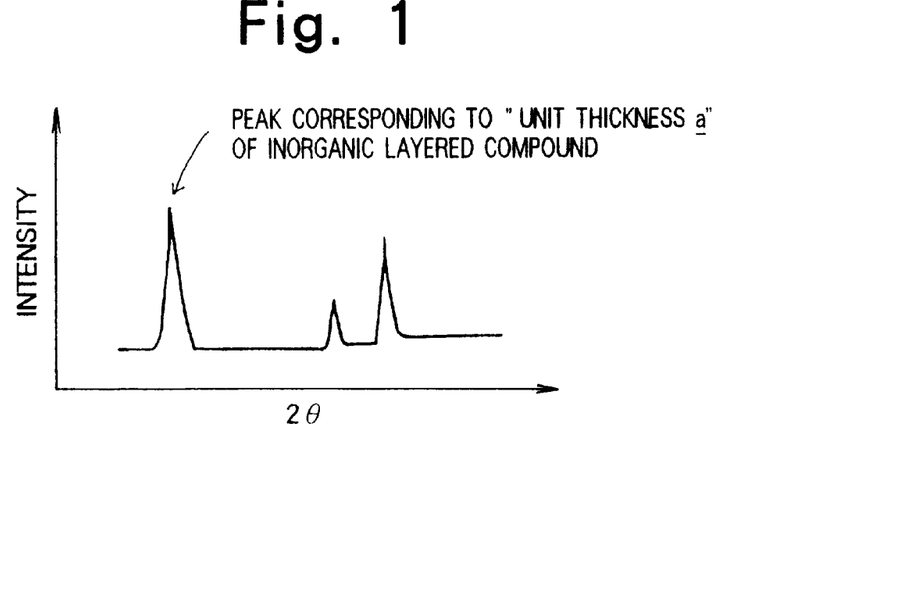
FIG. 1 is a graph schematically showing a relationship between an X-ray diffraction peak of an inorganic laminar compound and a "unit thickness a" of the compound.

In the present invention, the aspect ratio (Z) of the inorganic laminar compound is a ratio which may be determined on the basis of a relationship of $Z=L/a$. In this relationship, L is the particle size of an inorganic laminar compound determined by the dynamic light scattering method in a solvent, and a is the "unit thickness" of the inorganic laminar compound. The "unit thickness a" is a value which is determined on the basis of the measurement of the inorganic laminar compound alone, by a powder X-ray diffraction method, etc., as described hereinafter. More specifically, as schematically shown in the graph of FIG. 1 wherein the abscissa denotes 2·θ, and the ordinate denotes the intensity of X-ray diffraction peaks, the "unit thickness a" is a spacing obtained from the Bragg's equation (n·λ=2·D·sin θ, n=1, 2, 3 . . . ), wherein θ denotes the angle corresponding to the peak having the lowermost angle among those of the observed diffraction peaks. A person skilled in the art can refer to a book entitled "Kiki-Bunseki no Tebiki (Handbook on Instrumental Analysis) (a)", page 69, (1985), editorially supervised by Jiro SHIOKAWA, published by KAGAKU DOJIN K. K. for the details of the powder X-ray diffraction method.

In correspondence to the above relationship of $Z=L/a$ based on the measurement of the inorganic laminar compound alone, when the resin composition according to the present invention is subjected to the powder X-ray diffraction method, the lattice spacing d of the inorganic laminar compound contained in the resin composition may usually be obtained.

Figure 2:
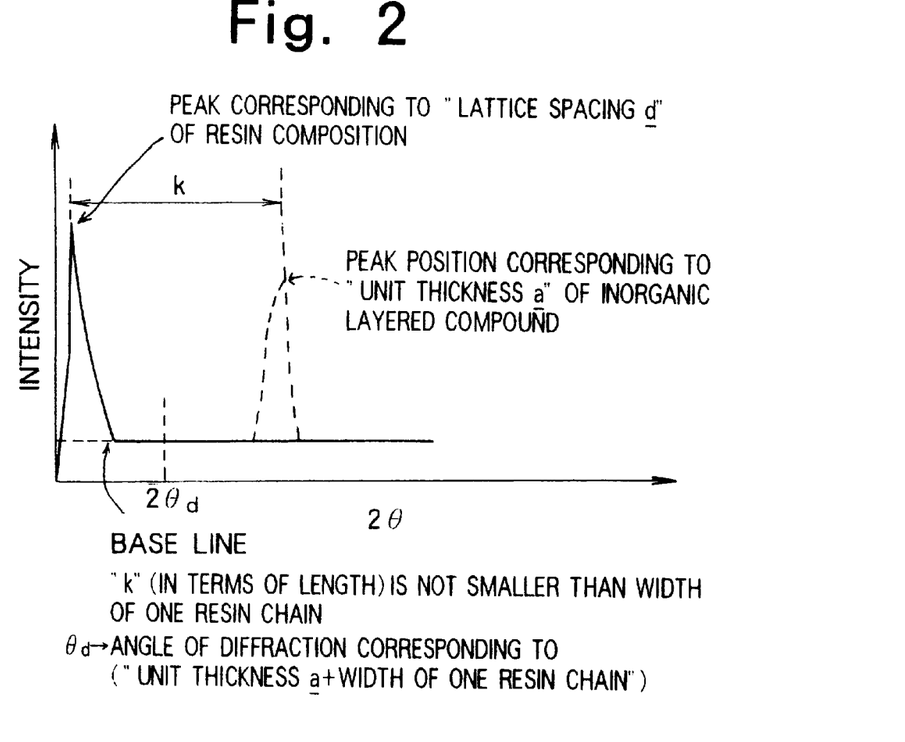
FIG. 2 is a graph schematically showing a relationship between an X-ray diffraction peak of a resin composition containing an inorganic laminar compound and a "lattice spacing (or distance between lattice planes) d" of the composition.
Figure 3:
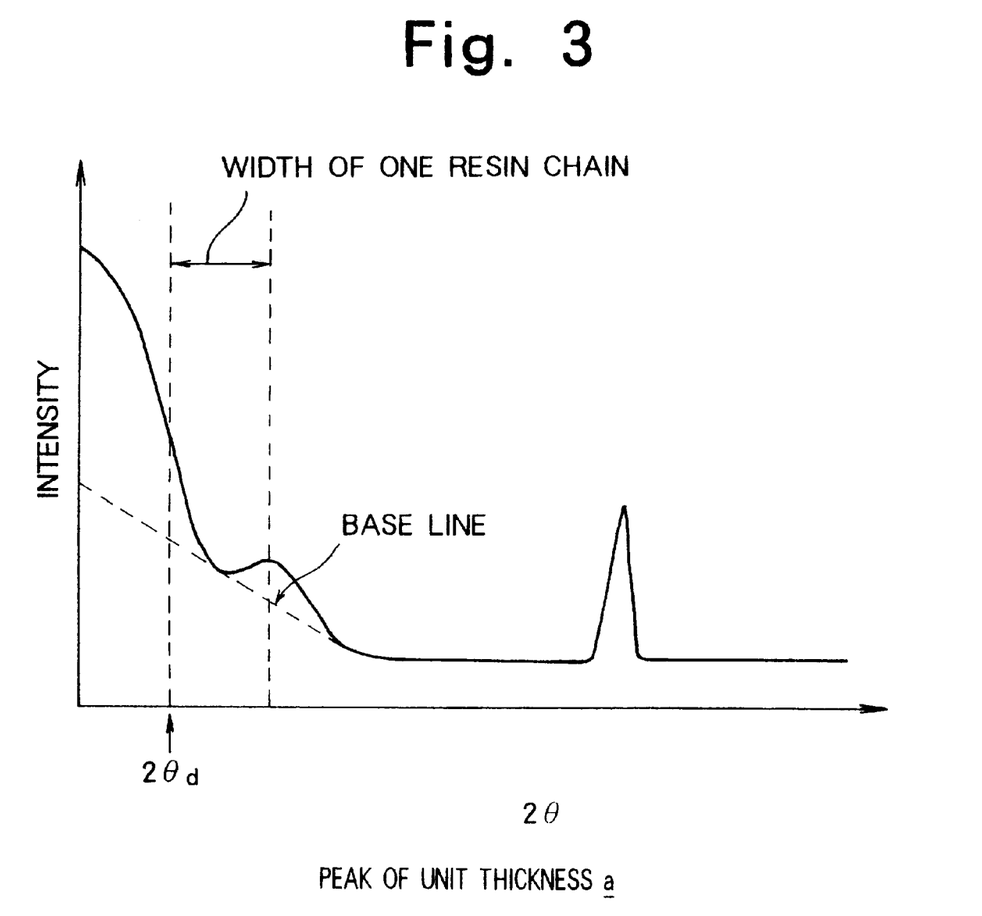
FIG. 3 is a graph schematically showing a relationship between an X-ray diffraction peak of a resin composition and a "lattice spacing d" of the composition, in a case where the peak corresponding to the lattice spacing d is superposed on halo (or background) and is difficult to be detected. In this Figure, the area obtained by subtracting a "base line" portion from the peak area in the lower angle side below $2 \cdot \theta_d$ is treated as the peak corresponding to the "lattice spacing d".

More specifically, as schematically shown in the graph of FIG. 2 wherein the abscissa denotes 2·θ, and the ordinate denotes the intensity of X-ray diffraction peaks, the "lattice spacing d" (a<d) is a spacing corresponding to the peak having the lowermost angle among the observed diffraction peaks appearing on the lower angle (larger spacing) side as compared with the position of the diffraction peak corresponding to the above-mentioned "unit thickness a". In a case where the above peak corresponding to the "lattice spacing d" is superposed on a halo (or background) as schematically shown in the graph of FIG. 3 so that it is difficult to detect such a peak, the area of a portion obtained by subtracting the base line portion from a portion corresponding to an angle lower than $2·θ_d$, is treated as a peak corresponding to the "lattice spacing d". The $\theta_d$ used herein is an angle of diffraction corresponding to "(unit length a+(width of one resin chain)". A person skilled in the art can refer to a book entitled "Nendo no Jiten (Encyclopedia of Clay)", page 35 et seq. and page 271 et seq., (1985), edited by Shuici IWAO et al., published by ASAKURA SHOTEN K. K. for the details of a method for determining "the lattice spacing d."

The integrated intensity of the diffraction peak (corresponding to the "lattice spacing d") observed in the powder X-ray diffraction of a resin composition may preferably have a relative ratio of not less than 2 (more preferably, not less than 10), with respect to the integrated intensity of the diffraction peak as a standard (corresponding to the "lattice spacing a").

In general, the difference between the above lattice spacing d and the "unit thickness a", namely, the value of k=(d−a) (when converted into "length") may be equal to, or larger than the width of one resin chain constituting the resin composition (k=(d−a)≧(width of one resin chain) ). The "width of one resin chain" may be determined by simulation calculation, etc. (as described in, e.g., a book entitled "KOBUNSHI KAGAKU JORON (Introduction to Polymer Chemistry)", pages 103–110 (1981), published by KAGAKU DOJIN K. K.). In the case of polyvinyl alcohol, this width is 4–5 Å (angstrom), and in the case of water molecules, this width is 2–3 Å.

It is considered that the above-mentioned aspect ratio Z=L/a is not always equal to "true aspect ratio" of the inorganic laminar compound in the resin composition. However, it is reasonable to approximate the "true aspect ratio" by the aspect ratio Z, for the following reason.

It is extremely difficult to directly measure the "true aspect ratio" of the inorganic laminar compound contained in a resin composition. On the other hand, in a case where there is a relationship of a<d between the lattice spacing d determined by the powder X-ray diffraction method for the resin composition, and the "unit thickness a" determined by the powder X-ray diffraction method for the inorganic laminar compound alone; and the value of (d−a) is not smaller than the width of one resin chain in the resin composition, it is assumed that the resin is inserted between layers of the inorganic laminar compound. Accordingly, it is sufficiently reasonable to approximate the thickness of the inorganic laminar compound in the resin composition by the above-mentioned "unit thickness a", i.e., to approximate the "true aspect ratio" in the resin composition by the above-mentioned "aspect ratio Z" of the inorganic laminar compound alone.

As mentioned above, it is extremely difficult to measure the true particle size in the resin composition. However, it may be considered that the particle size of the inorganic laminar compound in the resin is quite near to the particle size in a solvent, when the inorganic laminar compound, which has been fully swollen with a solvent of the same kind as that of the solvent used in the dynamic light scattering method, is combined with a resin to provide a resin composition.

However, it is hardly considered that the particle size L determined by the dynamic light scattering method exceeds the major axis length $L_{max}$ of the inorganic laminar compound, and therefore the possibility that true aspect ratio ($L_{max}$/a) is smaller than the "aspect ratio Z" used in the present invention (i.e., the possibility of $L_{max}$/a<Z), is theoretically very small.

In consideration of the above-mentioned two viewpoints, it is considered that the definition of the aspect ratio Z used in the present invention is sufficiently reasonable. Thus, in the present specification, the "aspect ratio" or "particle size" means the "aspect ratio Z" as defined above, or "particle size L" determined by the dynamic light scattering method.

Solvent

In the present invention, the solvent for swelling the inorganic laminar compound is not particularly limited, as long as it is usable in the production of the resin composition. For example, when a natural clay mineral having a swelling property is used as an inorganic laminar compound, specific examples of the solvent may include: water, alcohols such as methanol; polar solvent such as dimethylformamide, dimethyl sulfoxide, and acetone; or mixtures comprising two or more species selected from these solvents. It is preferred to use water or an alcohol such as methanol having a relatively low boiling point, in view of the ease in its removal after film formation or shaping of the resin composition.

Crosslinking Agent for Hydrogen-Bonding Group

In the present invention, in a case where a highly hydrogen-bonding resin is used as the biodegradable resin, a crosslinking agent for a hydrogen-bonding group may be used as desired, for the purpose of improving the water resistance (or barrier property after water-resistance environmental test) of the highly hydrogen-bonding resin.

The crosslinking agent for the hydrogen-bonding group usable in the present invention is not particularly limited. Preferred examples of the crosslinking agent may include: titanium-type coupling agent, silane-type coupling agent, melamine-type coupling agent, epoxy-type coupling agent, isocyanate-type coupling agent, copper compound, zirconia compound, etc. In view of the water resistance, a zirconia compound may particularly preferably be used.

Specific examples of the zirconia compound may include: halogenated zirconium such as zirconium oxychloride, hydroxy zirconium chloride, zirconium tetrachloride, and zirconium bromide; zirconium salts of mineral acid such as zirconium sulfate, basic zirconium sulfate, and zirconium nitrate; zirconium salts of organic acid such as zirconium formate, zirconium acetate, zirconium propionate, zirconium caprylate, and zirconium stearate; zirconium complex salts such as zirconium ammonium carbonate, zirconium sodium sulfate, zirconium ammonium acetate, zirconium sodium oxalate, zirconium sodium citrate, zirconium ammonium citrate; etc.

The amount of the addition of the crosslinking agent for a hydrogen-bonding group is not particularly limited, but the crosslinking agent may preferably be used so as to provide a ratio (K=CN/HN), i.e., ratio of the mole (CN) of the crosslinking-providing group of the crosslinking agent, to the mole (HN) of the hydrogen-bonding group of the highly hydrogen-bonding resin, which is not less than 0.001 and not more than 10. The above molar ratio K may more preferably be in the range of not less than 0.01 and not more than 1.

Transparency

A film or shaped article comprising the resin composition according to the present invention may preferably have a transparency, in view of advantage in a case where it is used for a purpose such as packaging. The transparency may preferably have a degree of not less than 80% (more preferably, not less than 85%) in terms of transmittance of whole light at a wavelength of 500 nm. For example, such a transparency may preferably be measured by means of a commercially available spectrophotometer (Automatic Recording Spectrophotometer Model-330, mfd. by Hitachi Seisakusho K. K.).

Oxygen Permeability

The resin composition, film or shaped article according to the present invention has a gas barrier property. The gas barrier property may preferably be not more than 0.5 cc/m$^2 \cdot$day$\cdot$atm, more preferably, not more than 0.2 cc/m$^2 \cdot$day$\cdot$atm (particularly preferably, not more than 0.15 cc/m$^2 \cdot$day$\cdot$atm), in terms of an oxygen permeability under the conditions of 30° C. and 60% RH (relative humidity).

Resin Composition

The method of formulating or producing the above composition comprising an inorganic laminar compound and a biodegradable resin is not particularly limited. In view of the homogeneity or ease in handling at the time of the formulation, it is possible to employ various methods. A first method involves obtaining a solution by dissolving resin, and obtaining a dispersion by preliminarily swelling or cleaving an inorganic laminar compound, and mixing these together, and thereafter removing the solvent. A second method involves adding a dispersion obtained by swelling or cleaving an inorganic laminar compound to a resin, and thereafter removing the solvent. A third method involves adding an inorganic laminar compound to a solution obtained by dissolving a resin and obtaining a dispersion in which the inorganic laminar compound is swollen or cleft, and thereafter removing the solvent. A fourth method involves kneading an inorganic laminar compound and a resin under heating, among other methods. The first, second and third methods are preferred in view of the ease of obtaining a large aspect ratio of the inorganic laminar compound.

In view of the improvement in the water resistance (barrier property after the water-resistance environmental test), it is preferred in the aforementioned first and second methods that the solvent is removed from the system and thereafter a thermal aging treatment is conducted at a temperature of not less than 110° C. and not more than 220° C. (more preferably, a temperature of not less than 130° C. and not more than 210° C.). The aging period of time is not particularly limited. In consideration of the necessity for a film temperature to reach at least a set temperature, for example, it is preferred to adopt an aging time of not less than 1 sec. and not more than 100 min. (more preferably, about 3 sec. to 10 min.) in the case of a drying method using a heating medium-contact type dryer such as hot-air dryer, in view of a balance between the water resistance and productivity.

The heat source to be used in the above aging treatment is not particularly limited. For example, it is possible to apply any of various methods such as those utilizing heat roll contact, heat medium contact (air, oil, etc.), infrared heating, and microwave heating.

The effect of improving the water resistance may remarkably be enhanced in a case where the biodegradable resin is a highly hydrogen-bonding resin, and/or the inorganic laminar compound is a clay mineral having a swelling property.

With respect to the composition ratio (volume ratio) between the inorganic laminar compound and the biodegradable resin used in the present invention, the volume ratio of inorganic laminar compound/biodegradable resin (ratio at the time of "Shikomi" (mixing for preparation)) may preferably be in the range of 5/95 to 90/10, more preferably in the range of 5/95 to 50/50 (particularly preferably, in the range of 10/90 to 30/70). A volume ratio in the range of 5/95 to 30/70 is advantageous because of the improved flexibility of the film or shaped article. In addition, a volume ratio in the range of 7/93 to 17/83 is advantageous because a decrease in the barrier property due to the folding is suppressed, and because of an increase in the peeling strength, etc.

Such a volume ratio may be determined by dividing respectively the numerator value (weight of the inorganic laminar compound) and the denominator value (weight of the biodegradable resin) constituting the weight ratio at the time of the "mixing for preparation" of these components, by respective densities. In general, there are situations in which the density of a biodegradable resin (e.g., polyvinyl alcohol) is somewhat different depending on the crystallinity thereof. However, it still is possible to calculate the volume ratio while assuming the crystallinity of the biodegradable resin to be 50%.

When the above volume ratio (volume fraction) of the above inorganic laminar compound/biodegradable resin is below 5/95, the barrier property is liable to be insufficient. On the other hand, when the above volume ratio exceeds 90/10, the resultant film forming property or formability is liable to be insufficient.

The method of formulating or producing the above composition comprising an inorganic laminar compound and a biodegradable highly hydrogen-bonding resin is not particularly limited. It is possible to use any of the following methods to produce or formulate the above composition. A first method involves dissolving a biodegradable and highly hydrogen-bonding resin, and obtaining a dispersion by preliminarily swelling or cleaving an inorganic laminar compound, mixing the foregoing with one other, and thereafter removing the solvent. A further method involves obtaining a dispersion by swelling or cleaving an inorganic laminar compound, adding it to a biodegradable and highly hydrogen-bonding resin, and thereafter removing the solvent. Yet another method involves kneading an inorganic laminar compound and a biodegradable and highly hydrogen-bonding resin together under heating conditions, among other methods. In view of easiness in the provision of a large aspect ratio of the inorganic laminar compound, it is preferred to adopt the former two methods.

Laminate Structure

The laminate structure or shaped structure of a resin composition according to the present invention is not particularly limited, as long as it comprises, as at least a portion (or layer) thereof, a biodegradable resin composition comprising a biodegradable resin and an inorganic laminar compound having an aspect ratio of not less than 50 and not more than 5000. More specifically, the resin composition according to the present invention may be shaped into any of various forms such as film, sheet, and container. However, in view of surer provision of the biodegradability of the entirety, it is preferred that a base material (i.e., the portion other than the portion or layer comprising the resin composition according to the present invention) in an embodiment wherein the resin composition according to the present invention is formed into a laminate-like shape, may also comprise a biodegradable material such as biodegradable resin, paper, and woody material.

Figure 4:
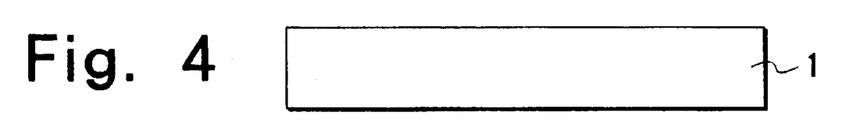
FIG. 4 is a schematic sectional view showing an embodiment of the biodegradable resin film according to the present invention.

FIG. 4 is a schematic sectional view showing an embodiment of the biodegradable resin film according to the present invention. Referring to FIG. 4, the biodegradable resin film in this embodiment comprises a layer 1 of a biodegradable resin composition containing an inorganic laminar compound.

Figure 5:
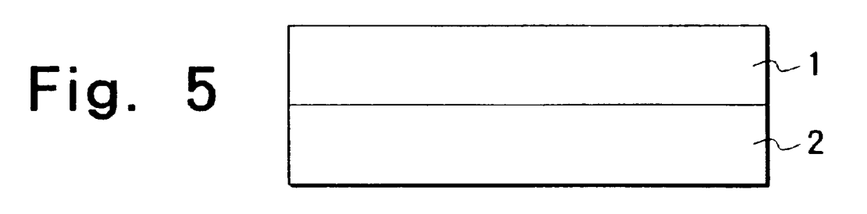
FIG. 5 is a schematic sectional view showing another embodiment (laminate type) of the biodegradable resin film according to the present invention.
Figure 6:
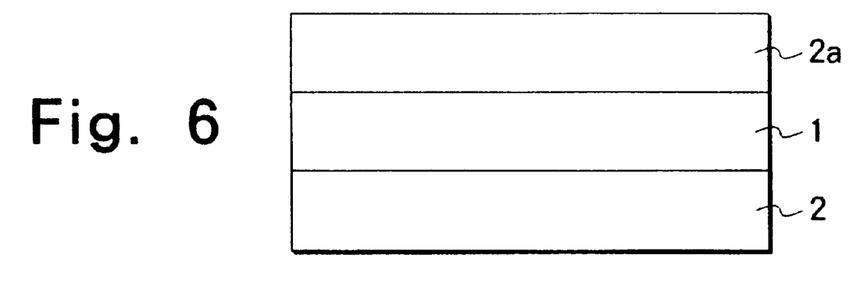
FIG. 6 is a schematic sectional view showing a further embodiment (laminate type) of the biodegradable resin film according to the present invention.

The biodegradable resin film according to the present invention may also have a laminate structure as shown in the schematic sectional views of FIG. 5 or 6. The biodegradable resin film in the embodiment of FIG. 5 comprises a base material layer 2 comprising a biodegradable resin, and a layer 1 of a biodegradable resin composition disposed thereon containing an inorganic laminar compound. On the other hand, the biodegradable resin film in the embodiment of FIG. 6 comprises a base material layer 2 comprising a biodegradable resin, a layer 1 of a biodegradable resin composition disposed thereon containing an inorganic laminar compound, and further a biodegradable resin layer 2a disposed on the biodegradable resin layer 1.

The method of laminating the above-mentioned resin composition according to the present invention on a base material is not particularly limited, but it is preferred to use, e.g., a coating method wherein a coating liquid is applied onto a film as a base material, and then dried and heat-treated. Specific examples of such a coating method may include: gravure methods such as direct gravure method, reverse gravure method and micro-gravure method; roll coating methods such as twin-roll bead coating method, and bottom-feed triple reverse coating method; doctor knife method, die coating method, dip coating method, bar coating method, and coating method combining these coating methods.

The thickness of a coating film (i.e., the thickness of a layer comprising a resin composition according to the present invention) may vary somewhat depending on the kind of a base material to be combined therewith, or an intended barrier performance, etc., but the thickness may preferably be not more than 10 $\mu$m in terms of the thickness after drying. In a case where a higher transparency is demanded, the thickness may preferably be not more than 2 $\mu$m (more preferably, not more than 1 $\mu$m) in terms of thickness after drying. The thickness of the coating film does not have a particular lower limit. In view of the provision of a sufficient gas barrier property, the thickness may preferably be 1 nm or, larger, more preferably 10 nm or larger (particularly preferably, 100 nm or larger).

In addition, it is possible to mix with or add to the resin composition, film or shaped article according to the present invention as desired, any of various additives such as ultraviolet light absorbing agent, colorant, and antioxidant, within a range wherein the effect of the present invention is not substantially impaired. Further, it is of course possible to use an adhesive or printing ink, as desired, e.g., at the time of laminating operation.

Hereinbelow, the present invention will be described in detail with reference to Examples, by which the present invention should not be limited.

EXAMPLES

The methods of measuring various physical properties used in the present specification are described below.

Biodegradability Test

There was provided a "Poly-Cup" having a capacity of 1000 mL, and four openings (each of 1 cm square) were provided to the bottom thereof so that the resultant four openings were arranged in a square-like configuration with a distance therebetween of about 15 mm from each other. Into the Poly-Cup, there was charged about 500 mL of culture soil (trade name: "Kumiai-Taihei Horticultural Soil", mfd. by Taihei Bussan Co.) containing 0.35 g/l kg (per culture soil) of nitrogen, 1.5 g/l kg of phosphoric acid, and 0.35 g/l kg of potassium, and having a pH of 6.0–6.5. Onto the surface of the thus charged culture soil, three pieces of sample films having a thickness of about 150 $\mu$m, and a base area of about 28.4 cm$^2$ were disposed so that the three sample films were not overlapped to each other. The thus disposed films were further covered with the above-mentioned culture soil so that the above-mentioned 1000 mL Poly-Cup was filled up with the soil.

The resultant Poly-Cup was placed on a predetermined place (open-air ground) and was left standing with the elapse of time, while providing water in an amount of about 200 mL per each Poly-Cup with a frequency of once per three days so as to always maintain the culture soil contained in the Poly-Cup in a wet state. After periods of one month and two months counted from the beginning of the test, sampling of the films was respectively conducted. After two months, the degree of the degradation of the films was determined on the basis of the appearances and residual area ratios thereof.

Place: 10-1, Tsukahara 2-chome, Takatsuki-shi, Osaka-fu, Japan (an open-air ground in Sumitomo Chemical Co., Ltd.; average temperature: about 25° C.).

Period: From Jun. 4, 1993 to Aug. 9, 1993 (about two months).

After the above "biodegradability test", the ratio of the base area of the film (residual area ratio, average of the above three sample films) remaining on the culture soil was determined according to the following formula (as the residual area ratio becomes smaller, the biodegradability is better).

Residual area ratio=(base area of film after the degradation test)/(base area of film before the degradation test)×100.

The appearance of the film was evaluated by naked eyes according to the following standard. The meanings of the respective symbols are as follows.

○: No change was observed.

Δ: The production of pores were observed.

x: The change in the film shape was marked.

x x: The original shape of the film was reduced to pieces.

Oxygen Permeability

Oxygen permeability was measured by using a method according to Japanese Industrial Standard (JIS) (JIS K-7126).

More specifically, a sample film (test piece) was mounted to a commercially available oxygen permeability measuring apparatus (trade name: OX-TRAN 10/50A, mfd. by MOCON Co. U.S.A.), and the oxygen permeability was measured under the measuring conditions of a temperature of 31° C. (humidity-controlled thermostat=21° C.). At this time, the relative humidity was about 61%. In this measurement, the oxygen permeability of the sample film was continuously measured, and the oxygen permeability at a point of time at which the oxygen permeability became substantially constant (usually, about several hours to three days after the initiation of the measurement) was used as the data thereof in this specification. When the oxygen transmission is represented by the ordinate of a graph, and the time t is represented by the abscissa thereof, the period of time ($\theta$ sec.) wherein the film interior reaches the equilibrium may be represented by an equation of $\theta=d^2/6\cdot D$, wherein d denotes the film thickness ($\mu$m) of the sample film, and D denotes a diffusion constant ($\mu$m)$^2$/sec). Accordingly, the period of time for the measurement is different depending on the kind of the sample.

Thickness Measurement

A thickness of not less than 0.5 $\mu$m was measured by means of a commercially available digital-type thickness measuring device (contact-type thickness measuring device, trade name: Ultra-High Precision Deci-Micro Head MH-15M, mfd. by Nihon Kogaku Co.).

On the other hand, a thickness of less than 0.5 $\mu$m was determined by a gravimetric analysis method, wherein the weight of a film having a predetermined area was measured, the resultant weight was divided by the area, and further divided by the specific gravity of the composition; or an elemental analysis method (in the case of a laminate comprising a biodegradable resin composition layer and a base material, etc.).

In a case where the elemental analysis (measuring principle: ICP emission spectrometry, with reference to a book entitled "ICP Emission Spectrometry", edited by Nihon Bunseki Kagaku-kai (Japan Society of Analytical Chemistry), 1988, published by Kyoritsu Shuppan) was used, the ratio between the layer of the resin composition according to the present invention and the base material was determined by calculation on the basis of the ratio between the analytical value of a predetermined inorganic element (originating from the composition) of the laminate, and the fraction of a predetermined element (e.g., Si) of the inorganic laminar compound alone.

Particle Size Measurement

Predetermined parameters such as the refractive index of a solvent (e.g., n=1.332 in the case of water), the viscosity of the solvent (e.g., η=0.890 cP, in the case of water), and the refractive index of an inorganic laminar compound (e.g., n=1.56 in the case of mica) were inputted to a commercially available ultrafine particle size analyzing apparatus (trade name: BI-90, mfd. by Brookheaven Co., U.S.A., Japanese agent: Nikkiso K. K.), and measurement was conducted at a temperature of 25° C., in a solvent of water, while a solution having a weight ratio (inorganic laminar compound/water) of 2% was diluted in accordance with an estimated particle size. Through such a method, the particle size L was determined as a central particle size value measured by a photon correlation method based on dynamic light scattering, which was automatically outputted from the above analyzer as a digital value. In this particle size measurement for the inorganic laminar compound, each time the measurement was conducted, calibration measurement was also conducted by using the following standard samples comprising true spherical fine particles, whereby it was confirmed that the measured data of the particle size of the standard samples fell within the range of relative error of ±10%.

True Spherical Fine Particles: particles mfd. by Dow Chemical Co., U.S.A., trade name: UNIFORM LATEX PARTICLES Particle sizes are determined by SEM (scanning electron microscope), Dow.

0.085 μm (deviation 0.0055 μm)
0.109 μm (deviation 0.0027 μm)
0.330 μm (deviation 0.0040 μm)
0.806 μm (deviation 0.0057 μm)
2.02 μm (deviation 0.0135 μm)
2.97 μm (deviation 0.23 μm)

Aspect Ratio Calculation

An inorganic laminar compound alone and a resin composition were respectively subjected to diffraction measurement by means of a commercially available X-ray diffractometer (trade name: XD-5A, mfd. by Shimazu Seisakusho K. K.) through a powder method. The lattice spacing (unit thickness) a was determined on the basis of the measurement of the inorganic laminar compound alone. In addition, it was confirmed that a portion in which the lattice spacing of the inorganic laminar compound had been increased (a potion it which lattice spacing d>a) was present in the resin composition, on the basis of the diffraction measurement of the resin composition.

By use of the resultant particle size L obtained by the dynamic scattering method, the aspect ratio Z was determined by using an equation of Z=L/a.

Example 1

Natural montmorillonite (trade name: Kunipia F, mfd. by Kunimine Kogyo K. K.) was dispersed in ion-exchange water (electric conductivity: 0.7 μS/cm or below) so as to provide a concentration of 2 wt. %, thereby to provide a dispersion of an inorganic laminar compound (Liquid A). The above montmorillonite had a particle size of 560 nm, a unit thickness a obtained by powder X-ray diffraction of 1.2156 nm, and an aspect ratio of 461.

Separately, a polyvinyl alcohol (trade name: PVA 117H, mfd. by Kuraray K. K., saponification degree=99.6%, degree of polymerization=1700) was dissolved in ion-exchange water (electric conductivity: 0.7 μS/cm or below) so as to provide a concentration of 2 wt.%, thereby to provide a resin solution (Liquid B).

The thus obtained Liquids A and B were mixed with each other so as to provide a solid content ratio (volume ratio) of (inorganic laminar compound/resin)=3/7, thereby to provide a coating liquid.

A 150 μm-thick poly-3-hydroxybutyrate (trade name: Biopol, mfd. by ICI) was used as a base film and was subjected to corona discharge treatment. Onto the thus treated base film, the coating liquid having the above composition was applied, and then dried at room temperature and further dried at 80° C. for two hours, thereby to provide a laminate film. The thickness after drying of the above coating layer was 0.5 μm.

The thus obtained biodegradable resin film had an oxygen permeability of 0.09 cc/m$^2$·day·atm at 31° C., 61% RH (relative humidity), and was found to have an excellent gas barrier property.

Figure 7:
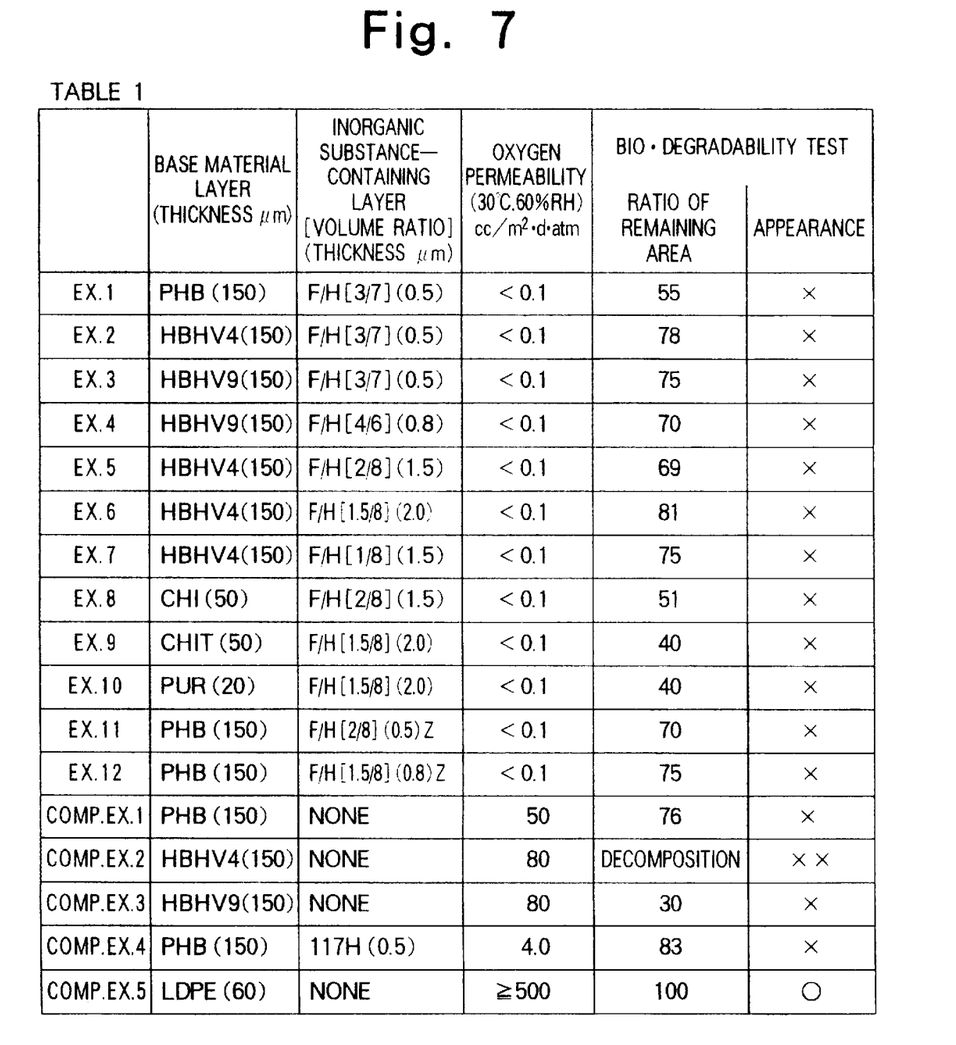
FIG. 7 (Table 1) is a table showing the structure of laminate films and the data of oxygen permeability, etc., obtained in Examples appearing hereinafter.

On the other hand, the above laminate film was subjected to a biodegradability test. As a result, the production of a large number of pores was observed by naked eyes. The film had a residual area ratio of 55% after two months, and showed an excellent degradability as shown in Table 1 (FIG. 7) appearing hereinafter.

Examples 2–10

Laminate films were prepared and were subjected to an oxygen permeability test, and a biodegradability test in the same manner as in Example 1, except that those constituents thereof were respectively changed to those shown in Table 1. The test results are shown in Table 1 appearing hereinafter.

As shown in the above Table 1, the laminate films obtained by these Examples were excellent both in the gas barrier property and in the biodegradability.

Example 11

Zirconium ammonium carbonate (trade name: Zircozol AC7, mfd. by Dai-ichi Kigenso Kogyo K. K., an aqueous solution containing 15 wt. % of the solute (calculated in terms of zirconium oxide)), as a crosslinking agent for hydrogen-bonding group was added to the mixture solution comprising the Liquid A and Liquid B prepared in Example 1 in an amount so as to provide a ratio of the zirconium element of one mole, with respect to 15 mole of the hydroxyl group of the polyvinyl alcohol.

By use of the resultant mixture, a laminate film was prepared and was subjected to an oxygen permeability test, and a biodegradability test in the same manner as in Example 1, except that the constituents thereof were changed to those as shown in Table 1. The measurement results are shown in Table 1 appearing hereinafter.

As shown in the above Table 1, the laminate film obtained by this example was excellent both in the gas barrier property, and in the biodegradability.

Example 12

Zirconium ammonium carbonate (trade name: Zircozol AC7, mfd. by Dai-ichi Kigenso Kogyo K. K., an aqueous solution containing 15 wt. % of the solute (calculated in terms of zirconium oxide)), as a crosslinking agent for hydrogen-bonding group was added to the mixture solution comprising Liquid A and Liquid B prepared in Example 1 in an amount so as to provide a ratio of the zirconium element of one mole with respect to 15 mole of the hydroxyl group the polyvinyl alcohol.

By use of the resultant mixture, a laminate film was prepared in the same manner as in Example 1, except that the other constituents were changed to those as shown in Table 1. Thereafter, the resultant laminate film was subjected to a heat treatment by means of a hot-air dryer at 140° C. for 10 min., thereby to provide a laminate film.

The thus prepared laminate film was subjected to an oxygen permeability test and a biodegradability test. As shown in the above Table 1, the laminate film obtained by this Example was excellent both in the gas barrier property and in the biodegradability.

Comparative Examples 1–3

Films were prepared and wire subjected to an oxygen permeability test, and a biodegradability test in the same manner as in Examples 1–3, except that a layer comprising a resin composition comprising an inorganic laminar compound and a biodegradable resin was not disposed. The test results are shown in Table 1.

As shown in the above Table 1, the films obtained by these Comparative Examples were considerably poor in the gas barrier property.

Comparative Example 4

A films was prepared and was subjected to an oxygen permeability test, and a biodegradability test in the same manner as in Examples 1–3, except that the dispersion of the inorganic laminar compound (Liquid A) used in Example 1 was not used. The test results are shown in Table 1.

As shown in the above Table 1, the film obtained by this Comparative Example was poor in the gas barrier property.

Comparative Example 5

A 60 µm-thick polyethylene film was prepared and was subjected to an oxygen permeability test. The test results are shown in Table 1.

As shown in the above Table 1, the above polyethylene film was considerably poor in the gas barrier property and in the biodegradability.

The meanings of the abbreviation used in the above Table 1 (FIG. 7) are as follows.

PHB: poly-3-hydroxybutyrate trade name: Biopol HVO %, mfd. by ICI)

HBHV4: 3-hydroxybutyrate (96%)-3-hydroxyvalerate (4%) copolymer (trade name: Biopol HV4%, mfd. by ICI)

HBHV9: 3-hydroxybutyrate (91%)-3-hydroxyvalerate (9%) copolymer (trade name: Biopol HV9%, mfd. by ICI)

CHI: Water-soluble chitin (A product obtained by about 50%-deacetylating a product "Chitin" (mfd. by Nakarai-tesque Co.) in a manner as described in a paper (T. Sarran et al., *Makromol. Chem.*, 177, 3589 (1976)), cast film CHIT: Chitosan (mfd. by Nakarai-tesque Co.), cast film PUR: Pullulan (mfd. by Nakarai-tesque Co.), cast film LDPE: A low-density polyethylene film product obtained by subjecting a polymer (trade name: Sumikathene F208-C mfd. by Sumitomo Chemical Co., Ltd.) to inflation shaping at 180° C.

F: Natural montmorillonite (trade name: Kunipia F, mfd. by Kunimine Kogyo Co.)

H: Polyvinyl alcohol (trade name: Poval 117H, mfd. by Kuraray K. K.)

Z: An aqueous solution of zirconium ammonium carbonate (trade name: Zircozol AC7, mfd. by Dai-ichi Kigenso Kogyo Co.)

FIGS. 8–13 respectively show powder X-ray diffraction peaks of inorganic laminar compound and composition having various values of the lattice spacing d.

Figure 8:
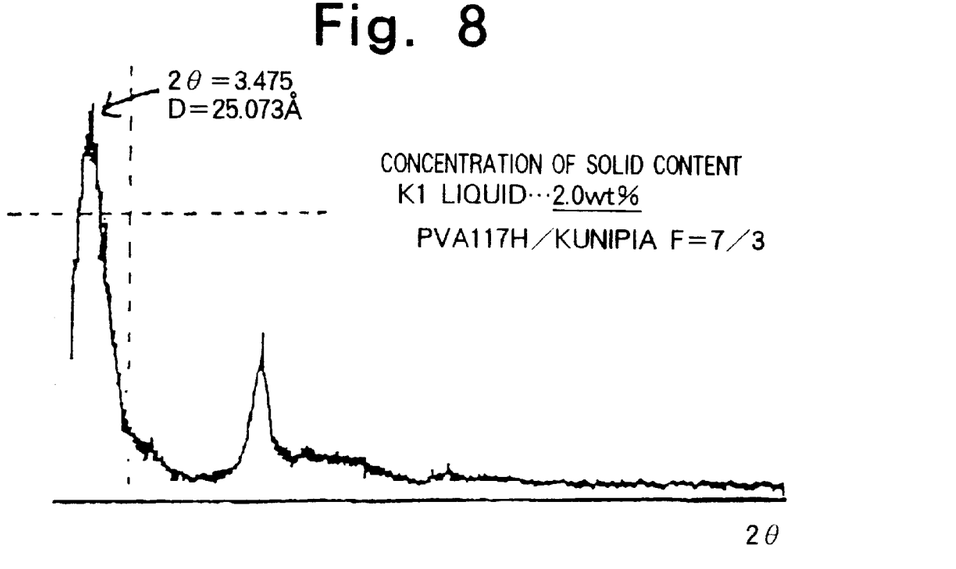
FIG. 8 is a graph showing X-ray diffraction peaks of a composition comprising a polyvinyl alcohol PVA-117H and "Kunipia F" used in Examples.
Figure 9:
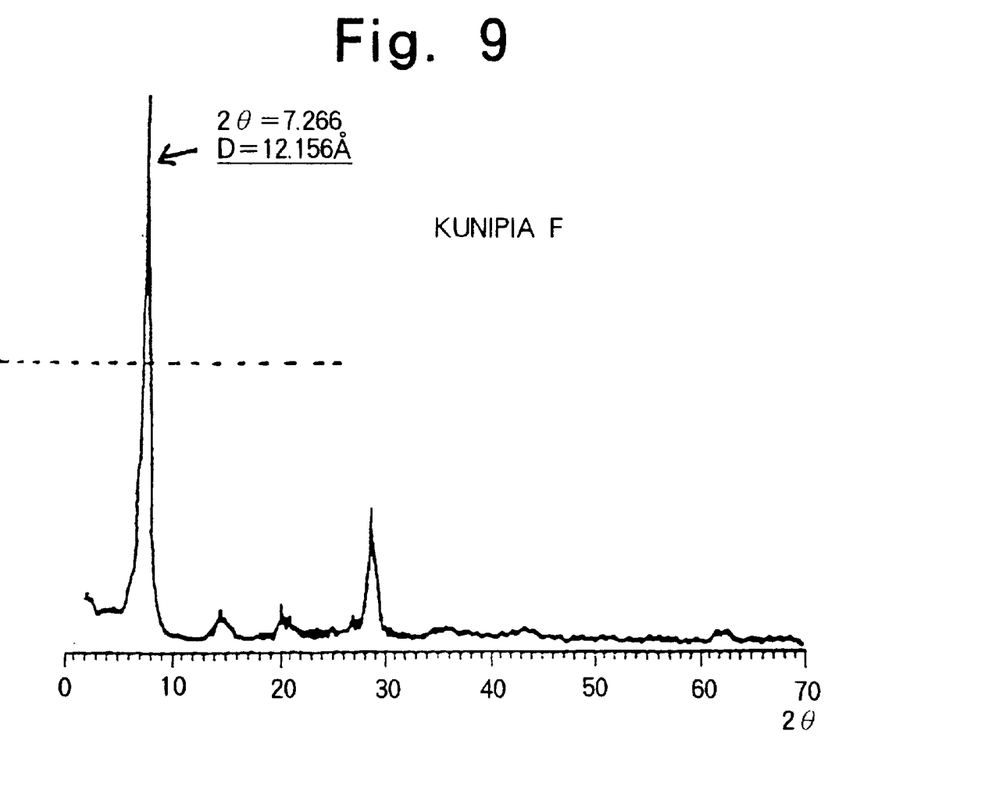
FIG. 9 is a graph showing X-ray diffraction peaks of "Kunipia F" (montmorillonite) used in Examples.

FIG. 8 is a graph showing X-ray diffraction peaks of a polyvinyl alcohol PVA-117H/"Kunipia F" composition used in the above Examples. FIG. 9 is a graph showing X-ray diffraction peaks of "Kunipia F" (montmorillonite) used in the above Examples.

Figure 10:
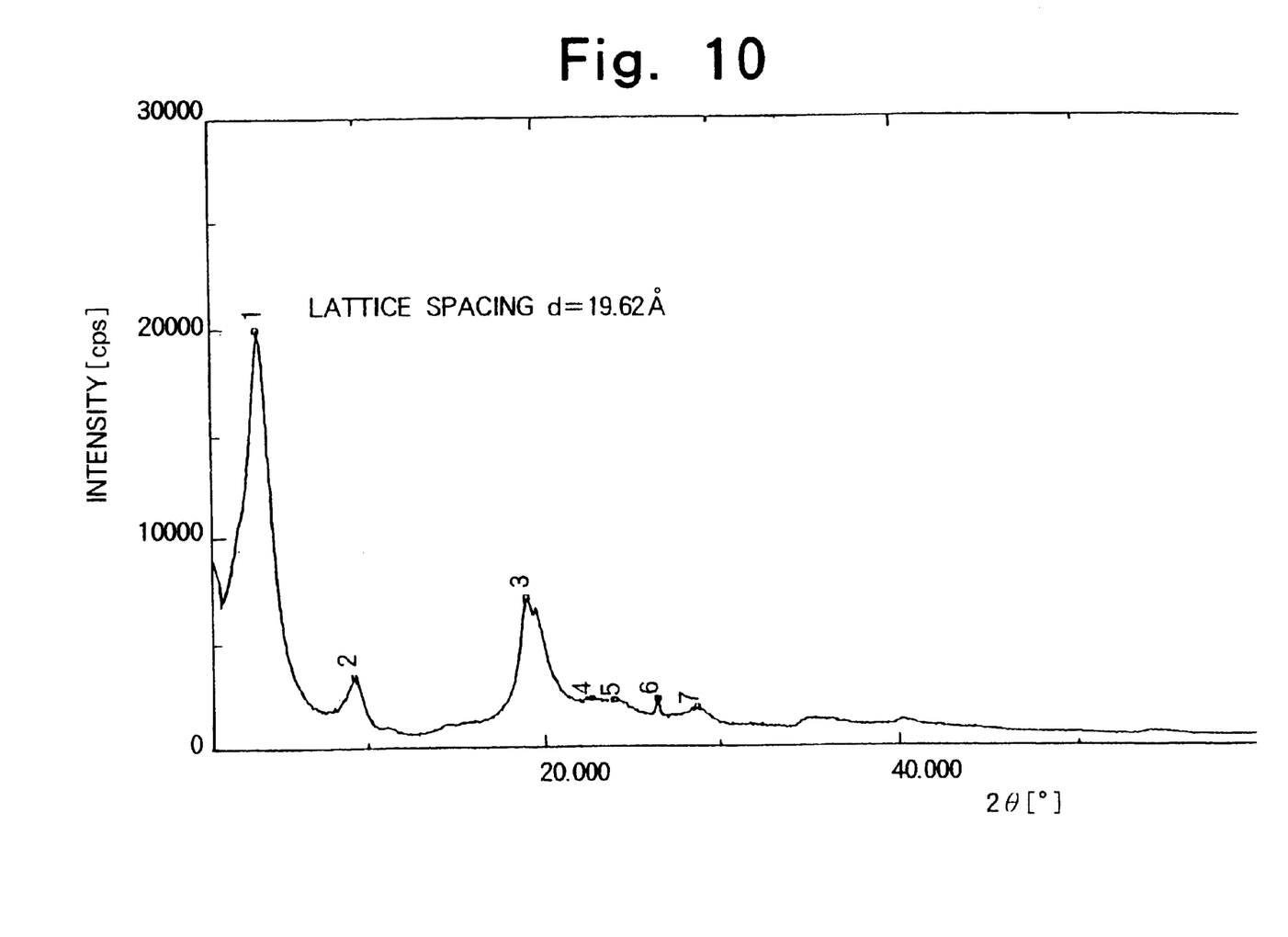
FIG. 10 is a graph showing X-ray diffraction peaks of a composition having a lattice spacing d=19.62 angstrom (pattern of the above FIG. 2).
Figure 11:
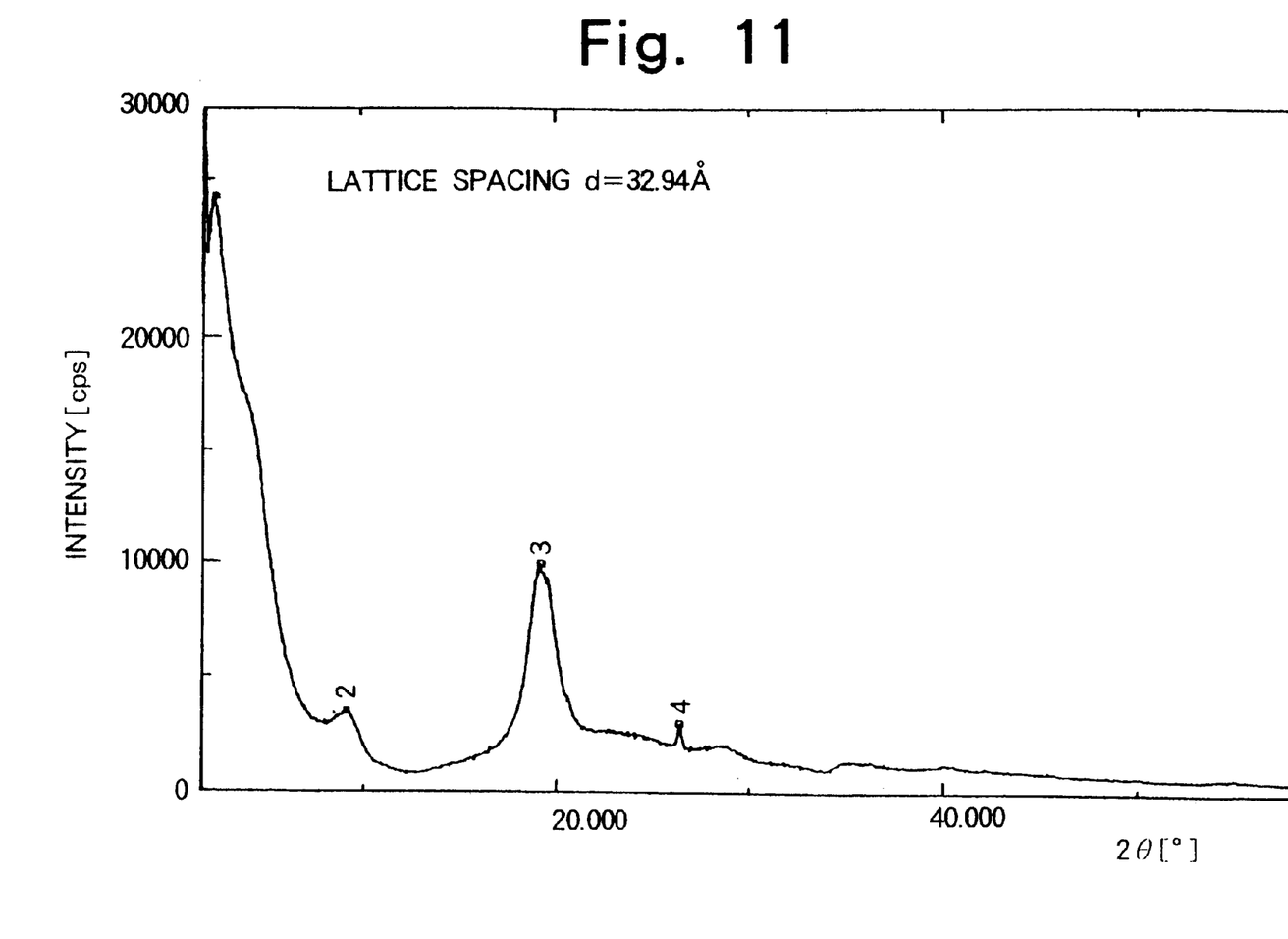
FIG. 11 is a graph showing X-ray diffraction peaks of a composition having a lattice spacing d=32.94 angstrom (pattern including the above patterns of FIGS. 2 and 3).
Figure 12:
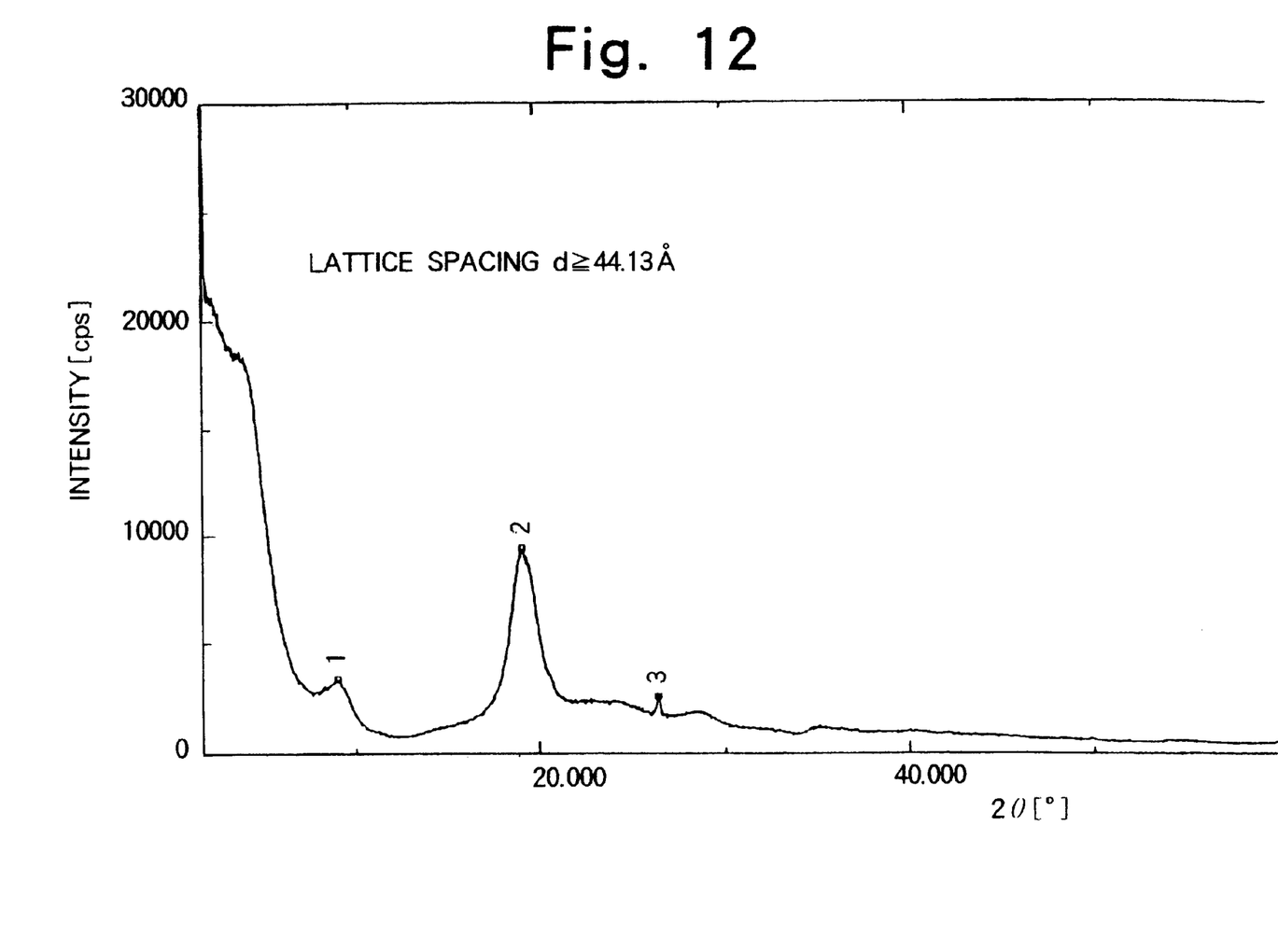
FIG. 12 is a graph showing X-ray diffraction peaks of a composition having a lattice spacing d≧44.13 angstrom (pattern of the above FIG. 3).
Figure 13:
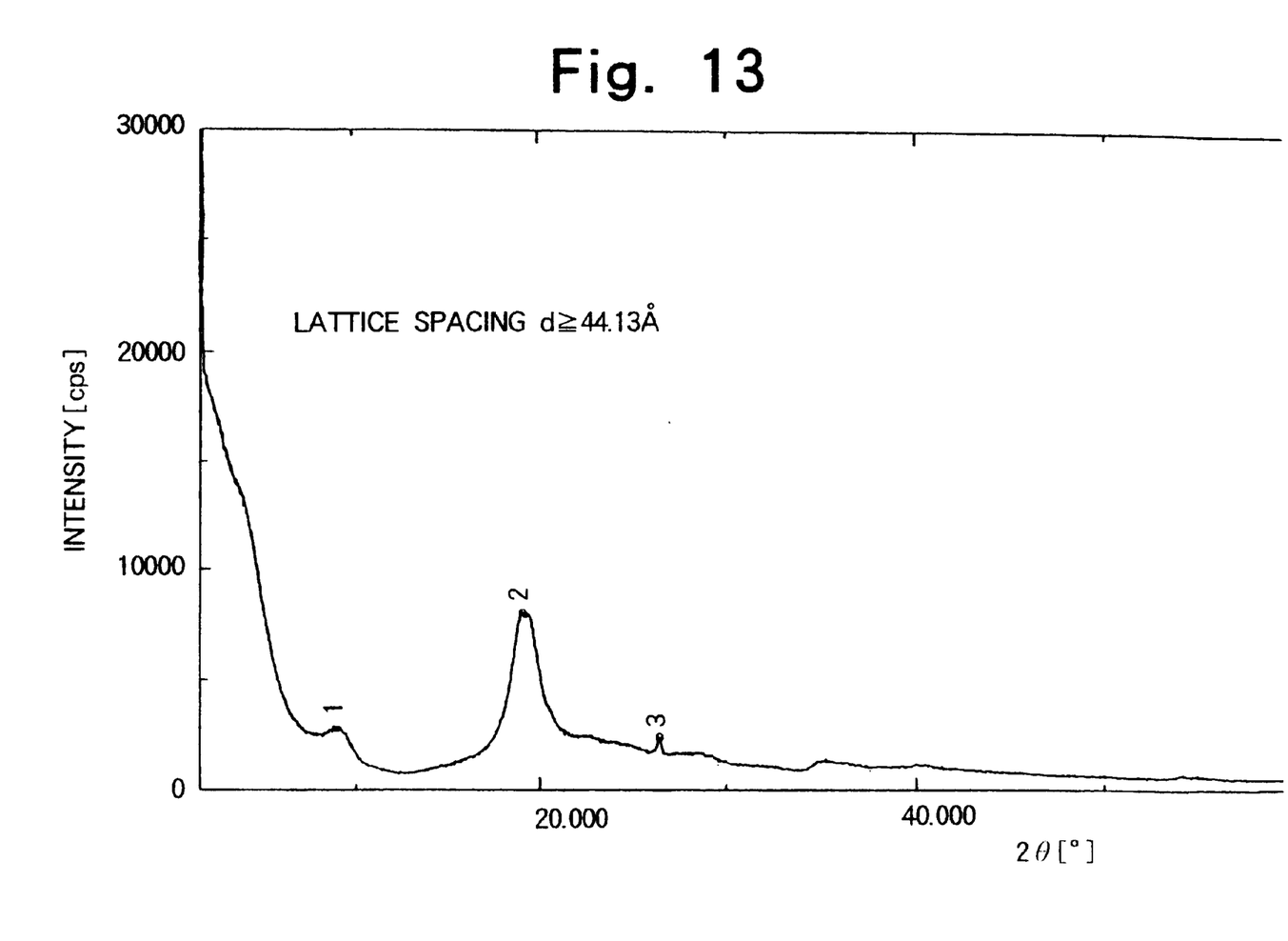
FIG. 13 is a graph showing X-ray diffraction peaks of a composition having a lattice spacing d≧44.13 angstrom (pattern of the above FIG. 3).

FIG. 10 (composition having a lattice spacing d=19.62 Å (pattern of the above FIG. 2), FIG. 11 (composition having a lattice spacing d=32.94 Å pattern of the above FIG. 2 or FIG. 3), FIG. 12 (composition having a lattice spacing d≧44.13 Å, pattern of the above FIG. 3), and FIG. 13 (composition having a lattice spacing d≧44.13 Å, pattern of the above FIG. 3) are graphs respectively showing powder X-ray diffraction peaks of compositions having various values of the lattice spacing d.

Industrial Applicability

As described hereinabove, the present invention provides a resin composition, a film, or a shaped article having a good gas barrier property, while substantially retaining the biodegradability thereof.

When the resin composition according to the present invention is formed into a film shape, it is suitable for use as a packaging material which is inclusive of: packaging for foods such as: "miso" (soybean paste), dried bonito, confectionery, Chinese noodles, ham, sausage, retorted foods, and frozen foods inclusive of croquette; and packaging for other contents such as chemicals or medicines, and precision materials. In addition, the resin composition according to the present invention is suitably usable as a shaped article in the form of bottle, tray, etc., to be used for a squeezing-type bottle of mayonnaise, juice, soy sauce, edible oil, sauce, food tray for microwave oven, cups for yogurt, etc.

The resin composition according to the present invention may exhibit a good biodegradability in any form or shape of those as described hereinabove. As a result, the present invention may considerably contribute to the maintenance or protection of a terrestrial environment such as the disposal of trash or rubbish, or plastic wastes; and reduction in the amount of wastes in a landfill.

What we claim is:

1. A biodegradable resin film having at least two layers having:

a first biodegradable layer comprising the composition which comprises:

a biodegradable resin which is capable of being biodegraded by the action of a microorganism, said biodegradable resin is a hydrogen-bonded resin wherein said hydrogen-bonded resin has 10% to 60% by weight of hydrogen-bonding groups selected from the group consisting of hydroxyl groups, amino groups, amide groups and thiol groups, and an inorganic laminar compound having aspect ratio (Z) of from 100 to 3000, wherein the aspect ratio (Z) is defined by the equation (Z)=L/(a), wherein L represents the particle diameter of the inorganic laminar compound measured in a solvent by a dynamic light scattering method, and (a) represents the unit thickness of the inorganic laminar compound measured by powder x-ray diffraction, and wherein said inorganic laminar compound is swollen or cleft in a solvent; and a second biodegradable layer comprising a material selected from the group consisting of polyester poly-3-hydroxybutyrate, 3-hydroxybutyrate-3-hydroxyvalerate copolymers, chitin, and chitosan.

2. A biodegradable resin film according to claim 1, wherein the composition has a relative ratio of the integrated intensity of the standard diffraction peak corresponding to the lattice spacing a to that of the diffraction peak corresponding to the lattice spacing d of 2 or more, wherein both the diffraction peaks are observed in the powder X-ray diffraction of the resin composition.

3. A biodegradable resin film according to claim 1, wherein the biodegradable resin a resin comprising a polyvinyl alcohol or a polysaccharide as a main component.

4. A biodegradable resin film according to claim 1, wherein the inorganic laminar compound is an inorganic laminar compound having a particle diameter of 5 $\mu$m of smaller.

5. A biodegradable resin film according to claim 1, wherein the inorganic laminar compound comprises a clay mineral having a swelling property.

6. A biodegradable resin film according to claim 1, wherein the biodegradable resin comprises a polyester producible by a microorganism as a main component.

7. A biodegradable resin film according to claim 1, wherein the biodegradable resin comprises a biodegradable polyester as a main component.

8. A biodegradable resin film according to claim 1, wherein the biodegradable resin film has, an oxygen permeability of not more than 0.2 cc/m$^2$•day•atm under the conditions of 30° C. and 60% RH (relative humidity).

9. A shaped article comprising a biodegradable resin film according to claim 1.

10. A biodegradable resin film according to claim 1, wherein the biodegradable resin is poly-3-hydroxybutyrate or 3-hydroxybutyrate-3-hydroxyvalerate copolymer.

* * * * *